Oct. 13, 1942.  F. DE L. BROWN  2,298,282
TRACTION UNIT
Filed May 19, 1939  2 Sheets-Sheet 2

Inventor
Floyd deL. Brown
By Semmes, Keegin & Semmes
Attorneys

Patented Oct. 13, 1942

2,298,282

UNITED STATES PATENT OFFICE 2,298,282

TRACTION UNIT

Floyd de L. Brown, New York, N. Y.

Application May 19, 1939, Serial No. 274,638

6 Claims. (Cl. 180—22)

This invention relates generally to a motor vehicle having a main drive mechanism and a plurality of drive wheel assemblies, and more especially to a manner of suspending the drive wheel assemblies and of supplying torque to the drive wheels.

One of the objects of my invention is to provide a motor vehicle provided with one or more pairs of freely suspended drive wheel assemblies, each of which is driven directly through a single drive mechanism.

Another object of my invention is to provide a motor vehicle of the type described in which the freely suspended drive wheels receive a constant torque regardless of their position in relation to the main drive mechanism of the said motor vehicle.

A further object of my invention is to provide a motor vehicle having a plurality of drive wheel mechanisms which are suspended in such a manner that their action tends to have a stabilizing effect when the vehicle is in motion.

With these and other objects in view, my invention embraces broadly the concept of a motor vehicle which is provided with one or more pairs of drive wheel assemblies. Each of these drive wheel assemblies is connected to the main drive mechanism of the motor vehicle and is freely suspended so as to be capable of an oscillatory movement. This oscillatory movement is limited by a tension device which enables each of the wheels to support a portion of the total weight of the vehicle.

This construction is highly advantageous because the individual oscillatory action of the wheel assemblies either in motion or at rest tends to stabilize the motor vehicle and equalize the weight supported by each of the drive wheel units. This equalizing effect also reduces stresses and strains on the body and framework when the motor vehicle is being operated at high speeds over rough terrain or when the vehicle is heavily loaded. Moreover, this oscillatory action enables the drive wheels to compensate for inequalities of the surface over which the vehicle is passing, thereby permitting the wheels to remain in contact with the ground and exert a maximum traction effect.

The manner of supplying power to each drive wheel assembly directly from the main drive mechanism is advantageous because by this construction a constant torque is supplied to the drive wheels at all points in their arc of oscillatory movement. Moreover, by means of this construction, extra sprockets which are normally necessary as chain tighteners are eliminated, thereby eliminating excessive chain wear and rendering constant readjustment of the tension of the chains unnecessary.

It is believed apparent from the above description that I have provided a motive unit which is rendered highly efficient by the type of drive wheel assembly and driving means with which it is supplied. While for purposes of illustration I have shown only a fragment of a motor vehicle showing the driving connections to two wheels, it is within the scope of this invention that any number of wheels may be used depending on the requirements of the type of motor vehicle to which my invention is applied. The main drive mechanism can also be varied and mechanical equivalents supplied to the wheel assembly construction, suspension and wheel drive without departing from the spirit and scope of this invention.

Figure 1:
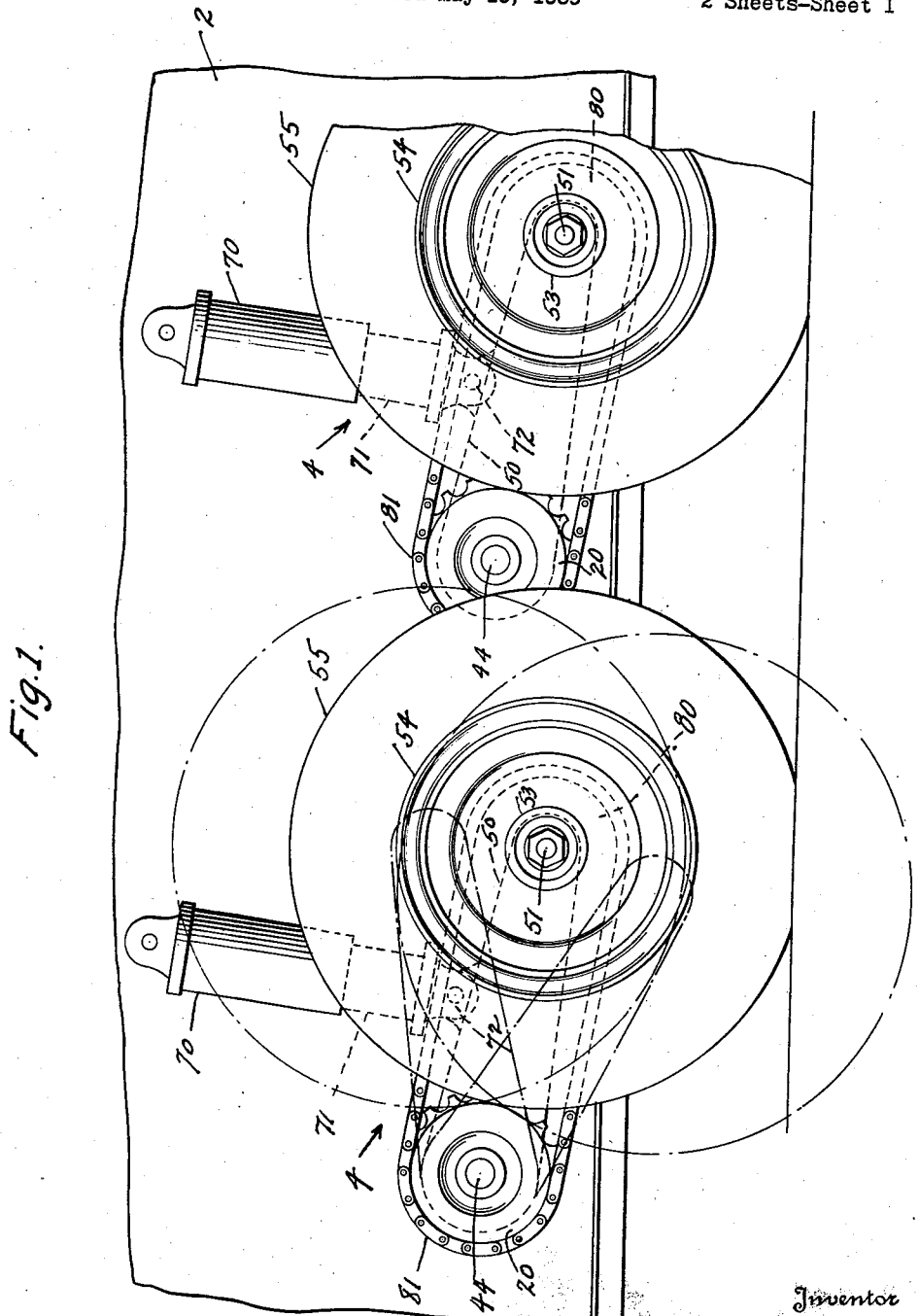
Figure 1 is a fragmental view in side elevation disclosing a number of positions which may be assumed by the freely suspended drive wheels of the motor vehicle.

As shown in the drawings, my invention relates to a motor vehicle, generally designated by the numeral 1, which consists of a frame 2, a main drive mechanism, which is generally designated by the numeral 3, a freely suspended wheel assembly 4, and a wheel drive mechanism 5. A power unit, which is not shown, is also mounted on the frame 2 and is connected directly to the main drive mechanism 3.

Figure 2:
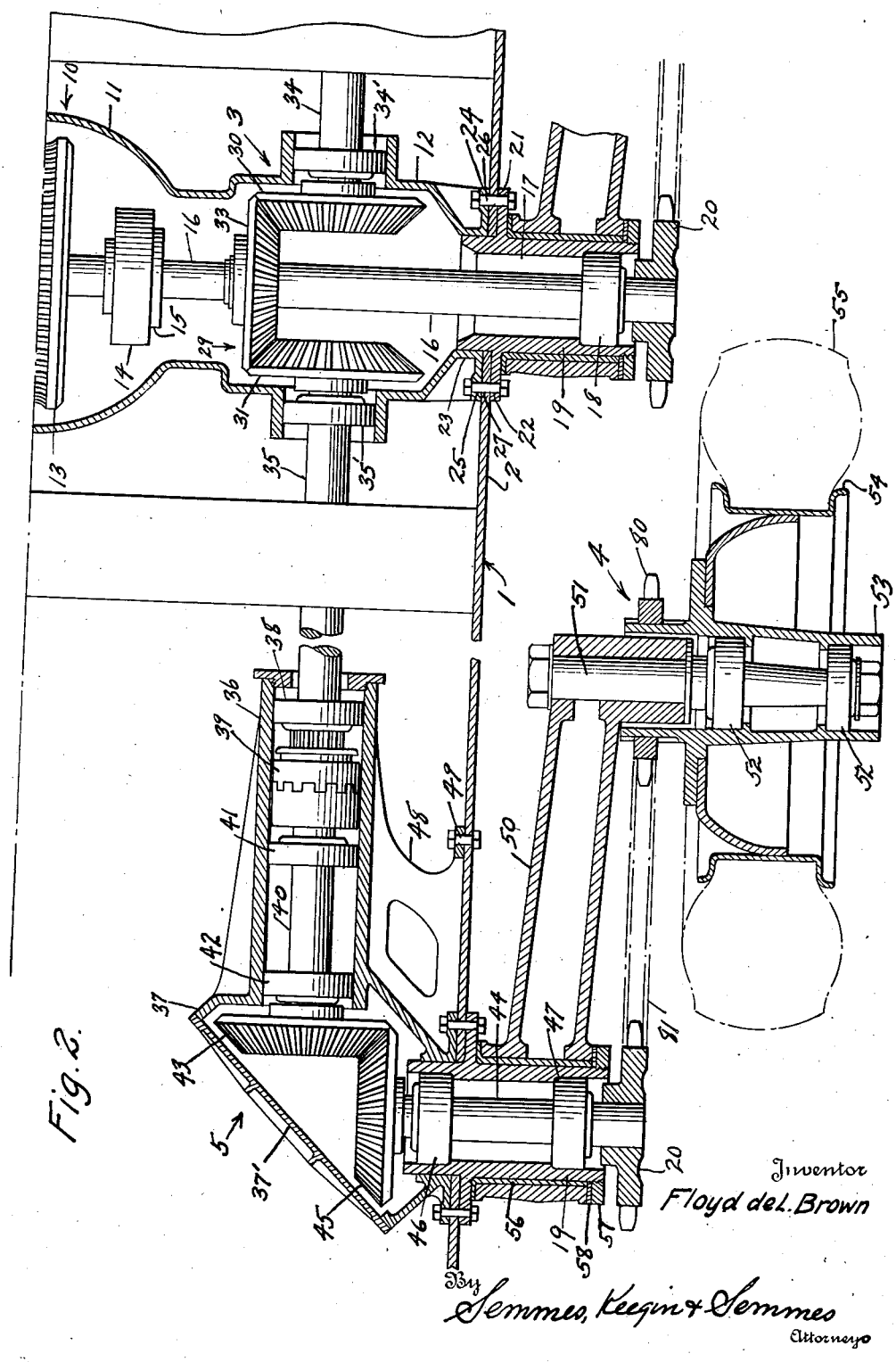
Figure 2 is a fragmental, horizontal, sectional view of the motor vehicle, disclosing a portion of the main drive mechanism, the wheel suspension, and the wheel drive.

As shown in detail in Figure 2, the main drive mechanism 3 is composed of a differential gear 10 which consists of a housing 11 suspended between a pair of transmission gear housings 12 which are mounted on opposite sides of the frame in a manner which will be subsequently described. Mounted within the housing 11 is a ring gear 13 which is adapted to engage a worm gear mounted on a drive shaft connected to the power unit. The ring gear 13 is mounted on a bearing 14 journalled in a pair of bearings 15 and imparts a torque to a pair of opposed shafts 16.

These shafts 16 extend transversely across the frame 2 through the gear housing 12, and as they are of similar construction and similarly mounted, only one shaft and the main drive mechanism to which it is connected are shown in the drawings, it being understood that the opposite side of the main drive mechanism is identical in structure.

The shaft 16 extends outwardly through the gear housing 12 and an aperture 17 in the frame 2, and its outer extremity is journalled in a bearing 18 which is supported by a tubular member 19. Rigidly mounted on the extremity of the shaft 16 is a drive sprocket 20.

The tubular member 19 is provided with an annular flange 21 which is integrally formed and is provided with a plurality of spaced apertures 22. In operative position, the inner extremity of the tubular member 19 extends through the aperture 17 in the frame 2 and forms a snug fit within a collar 23 formed on the gear housing 12. The collar 23 is also provided with an annular flange 24 provided with spaced apertures 25.

When in mounted position, the flange 21 is designed to limit the inward movement of the tubular collar 19 and the flange 24 insures a constant contact between the housing 12 and the frame 2. The tubular member 19 and the housing 12 are held in this fixed position by means of bolts 26 which extend through apertures 27 in the frame 2 and aligned apertures 22 and 25 in the members 19 and 12, respectively.

The transmission gears 29 situated within the gear box 12 consist of a pair of beveled gears 30 and 31 which are driven by a beveled gear 33 attached to an intermediate portion of the shaft 16. The gears 30 and 31 are mounted on the extremity of a rearwardly extending shaft 34 and a forwardly extending shaft 35, respectively. These shafts 34 and 35 are journalled in bearings 34' and 35' which are carried by the housing 12. As the construction and means of mounting of both of these shafts is identical, only shaft 35 will be described for purposes of illustration.

The forwardly extending shaft 35 terminates in an extension 36 of a beveled gear housing 37. The shaft 35 is journalled in a bearing 38 mounted within the extension 36 and is operatively connected by means of a sliding clutch 39 to a shaft 40. This shaft 40 is driven in bearings 41 and 42 and is provided with a beveled gear 43 which drives a short shaft 44 through a beveled gear 45. These beveled gears are protected by a removable closure member 37'.

The shaft 44 is journalled in bearings 46 and 47 carried by a tubular member 19 and has affixed to its outer end a driving sprocket 20. The beveled gear housing 37 and the tubular member 19 are mounted in the manner similar to that which has been previously described in connection with the housing 12, except that the extension 36 is provided with an additional support in the form of a web 48 which is secured to the frame 2 by a bolt 49.

Each of the drive wheel assemblies 4 attached to the frame 2 is similar in construction and is composed of a radial arm 50, which may be of tubular welded construction, and is bored at one end to receive a stub shaft 51 provided with bearings 52 upon which is mounted a hub of any suitable design 53 which carries a wheel rim 54 provided with a suitable tire 55.

Each of the radial arms 50 is rotatively mounted on one of the tubular members 19 from which it is separated by a flanged bushing 56. The radial arm 50 is held in position by means of a threaded collar 57 which engages the threaded extremities of the tubular member 19 and is separated from the radial arm 50 by means of a washer bearing 58.

As best shown in Figure 1, each radial arm 50 is suspended and its movement is retarded by means of a compression element 70 which is carried by a bracket, not shown, mounted on the exterior surface of the frame 2. The unit 70 is preferably of the air cushioning type and is provided with a piston 71, the lower end of which is mounted on the radial arm 50 at a point intermediate its length, as indicated at 72. The suspension device 70 is furnished with a volume of air under compression by means of a flexible conduit, which is not shown, but which passes through an aperture in the frame 2 and connects the cylinder of the suspension element 70 to an adequate supply of compressed fluid. In operation, the pressure of the fluid acting against the piston 71 tends to force the radial arm 50 downward, as indicated in Figure 1, and enables the wheel 54 to be in a position to support and furnish traction for driving the motor vehicle 1.

The wheel drive mechanism 5 for each wheel assembly 4 consists of a driven sprocket 80 which is splined on the inner end of the hub 53 and is driven by the sprocket 20 through a chain or other suitable connecting means 81. This construction supplies power to the drive wheels regardless of the position assumed by the radial arm 50.

In operation, the differential gear 13 supplies torque to the shaft 16 which is transmitted directly by this shaft to the drive sprocket 20 mounted on its extremity. Torque is also transmitted by the shaft 16 to the shafts 34 and 35 to the forward and rear drive wheels. This power is transmitted through the shafts 34 and 35 to the clutches 39, shafts 40, beveled gears 43 and 45, shaft 44, to the sprocket 20. The power is then transmitted to the driven sprockets 80 by means of the chains 81.

It is believed obvious from this description that I have provided a means by which the drive wheels 54 may be driven directly from the main drive mechanism 3 without the necessity of using chain tightening for the drive chains 81. Moreover, by positioning the sprockets 20 and 80 in the manner described, a constant torque is supplied to the wheels 54 regardless of the position of the radial arm 50.

The oscillatory action of the radial arm 50 against the tension of the suspension unit 70 permits the wheel assemblies to compensate for inequalities of the surface over which the tires 55 are passing. This tends to stabilize the vehicle and the load and permits the wheels to exert a maximum traction effect due to the fact that the tires 55 are in constant contact with the ground.

While for purposes of illustration I have disclosed one type of drive mechanism, it is obvious that my invention may be used with any motor vehicle having any suitable type of main drive mechanism. Moreover, various mechanical equivalents may be used in connection with the drive wheel assemblies without departing from the scope of this invention.

I, therefore, do not intend this invention to be limited to the specific embodiment disclosed in the drawings for purposes of illustration, but that on the contrary it is to be limited only by the prior art and the scope of the appended claims.

I claim:

1. In a vehicle of the character described, a frame, a main drive mechanism carried by said frame, a plurality of supporting drive wheel assemblies disposed at opposite sides of said frame, suspension means for each wheel assembly including a rigid arm pivoted at one end to the frame and carrying a wheel at the other end, resilient means for each arm for resisting movement of the arm about its pivot, a shaft on each side of the vehicle extending transversely of the frame and differentially coupled to the main drive mechanism, each of said transverse shafts extending through the end of one of the arms, which end is pivoted to the frame, means for transmitting motion from the end of each of the transverse shafts to the wheel carried by the arm associated therewith, a longitudinally extending shaft on each side of the frame, means for transmitting motion from said transverse shafts to said longitudinal shafts, stub shafts extending through the pivoted ends of the other of said arms, means for transmitting rotary motion from said longitudinal shafts to said stub shafts, and means for transmitting motion from each stub shaft to the wheel carried by the arm with which said stub shaft is associated.

2. In a vehicle of the character described, a frame, a main drive mechanism carried by said frame, a plurality of supporting drive wheel assemblies disposed at opposite sides of said frame, suspension means for each wheel assembly including a rigid arm pivoted at one end to the frame and carrying a wheel at the other end, a compressible unit for each arm mounted on the frame and pivotally secured to the arm intermediate its ends to resist movement of the arm, a shaft on each side of the vehicle extending transversely of the frame and differentially coupled to the main drive mechanism, each of said transverse shafts extending through the end of one of the arms, which end is pivoted to the frame, means for transmitting motion from the end of each of the transverse shafts to the wheel carried by the arm associated therewith, a longitudinally extending shaft on each side of the frame, means for transmitting motion from said transverse shafts to said longitudinal shafts, stub shafts extending through the pivoted ends of the other of said arms, means for transmitting rotary motion from said longitudinal shafts to said stub shafts, and means for transmitting motion from each stub shaft to the wheel carried by the arm with which said stub shaft is associated.

3. In combination with a motor vehicle having a main drive mechanism and a frame, a plurality of supporting drive wheel assemblies disposed at opposite sides of said frame, suspension means for each wheel assembly including a rigid arm pivoted at one end to a tubular shaft which is mounted on the frame and carrying at the other end a shaft upon which is mounted the drive wheel, a compressible unit mounted on the frame and pivotally secured to said arm intermediate its ends to resist movement thereof, a shaft on each side of the vehicle extending transversely of the frame and differentially coupled to the main drive mechanism, one of said transverse shafts extending through one of said tubular shafts on one side of the vehicle and the other transverse shaft extending through one of the tubular shafts on the other side of the vehicle, means for transmitting rotary motion from each of said transverse shafts to the wheels carried by the arms mounted on the tubular shafts through which said transverse shafts extend, shafts mounted on each side of the vehicle and extending longitudinally thereof, bevel gears mounted on the transverse and longitudinal shafts for connecting and transmitting rotary motion from the transverse to the longitudinal shafts on the respective sides of the vehicle, a stub shaft mounted within each of the other tubular shafts, means for transmitting rotary motion from each of said longitudinal shafts to the stub shafts on the respective sides of the vehicle, and means for transmitting rotary motion from each of said stub shafts to the wheels of the arms with which said stub shafts are associated.

4. In combination with a motor vehicle having a main drive mechanism and a frame, a plurality of supporting drive wheel assemblies disposed at opposite sides of said frame, suspension means for each wheel assembly including a rigid arm pivoted at one end to a tubular shaft which is mounted on the frame and carrying at the other end a shaft upon which is mounted the drive wheel, a compressible unit consisting of a cylinder mounted on the frame, and a piston within the cylinder, said piston being attached to said arm intermediate its ends to resist movement thereof, a shaft on each side of the vehicle extending transversely of the frame and differentially coupled to the main drive mechanism, one of said transverse shafts extending through one of said tubular shafts on one side of the vehicle and the other transverse shaft extending through one of the tubular shafts on the other side of the vehicle, means for transmitting rotary motion from said transverse shafts to the wheels carried by the arms mounted on the tubular shafts through which said transverse shafts extend, shafts mounted on each side of the vehicle and extending longitudinally thereof, bevel gears mounted on the transverse and longitudinal shafts for connecting and transmitting rotary motion from the transverse to the longitudinal shafts on the respective sides of the vehicle, a stub shaft mounted within each of the other tubular shafts, means for transmitting rotary motion from said longitudinal shafts to the stub shafts on the respective sides of the vehicle, and means for transmitting rotary motion from each of said stub shafts to the wheels of the arms with which said stub shafts are associated.

5. In combination with a motor vehicle having a main drive mechanism and a frame, a plurality of supporting drive wheel assemblies disposed at opposite sides of said frame, suspension means for each wheel assembly including a rigid arm pivoted at one end of a tubular shaft which is mounted on the frame and carrying at the other end a shaft upon which is mounted the drive wheel, a compressible unit consisting of a cylinder mounted on the frame, and a piston within the cylinder, said piston being attached to said arm intermediate its ends to resist movement thereof, a shaft on each side of the vehicle extending transversely of the frame and differentially coupled to the main drive mechanism, one of said transverse shafts extending through one of said tubular shafts on one side of the vehicle and the other transverse shaft extending through one of the tubular shafts on the other side of the vehicle, means for transmitting rotary motion from said transverse shafts to the wheels carried by the arms mounted on the tubular shafts through which said transverse shafts extend, shafts mounted on each side of the vehicle and extending longitudinally thereof, bevel gears mounted on the transverse and longitudinal shafts for connecting and transmitting rotary motion from the transverse to the longitudinal shafts on the respective sides of the vehicle, a stub shaft mounted within each of the other tubular shafts, beveled gears mounted on the longitudinal and stub shafts on the respective sides of the vehicle for connecting and transmitting rotary motion from the longitudinal shafts to the stub shafts, clutch means associated with the longitudinal shafts to prevent said rotary motion from being transmitted to the stub shafts when the clutch is in open position, and means for transmitting rotary motion from each of said stub shafts to the wheels of the arms with which said stub shafts are associated.

6. In combination with a motor vehicle having a main drive mechanism and a frame, a plurality of supporting drive wheel assemblies disposed at opposite sides of said frame, suspension means for each wheel assembly including a rigid arm pivoted at one end to a tubular shaft which is mounted on the frame and carrying at the other end a shaft upon which is mounted the drive wheel, a compressible unit consisting of a cylinder mounted on the frame, and a piston within the cylinder, said piston being attached to said arm intermediate its ends to resist movement thereof, a shaft on each side of the vehicle extending transversely of the frame and differentially coupled to the main drive mechanism, one of said transverse shafts extending through one of said tubular shafts on one side of the vehicle and the other transverse shaft extending through one of the tubular shafts on the other side of the vehicle, means for transmitting rotary motion from said transverse shafts to the wheels carried by the arms mounted on the tubular shafts through which said transverse shafts extend, shafts mounted on each side of the vehicle and extending longitudinally thereof, bevel gears mounted on the transverse and longitudinal shafts for connecting and transmitting rotary motion from the transverse to the longitudinal shafts on the respective sides of the vehicle, a stub shaft mounted within each of the other tubular shafts, beveled gears mounted on the longitudinal and stub shafts on the respective sides of the vehicle for connecting and transmitting rotary motion from the longitudinal shafts to the stub shafts, clutch means associated with the longitudinal shafts to prevent said rotary motion from being transmitted to the stub shafts when the clutch is in open position, a sprocket mounted on the outer extremity of each stub shaft, a sprocket mounted on each of the wheel carrying arms, and a chain connecting each pair of said associated sprockets whereby rotary motion is transmitted from the stub shafts to the wheels.

FLOYD DE L. BROWN.